United States Patent [19]

Lung

[11] Patent Number: 5,029,108
[45] Date of Patent: Jul. 2, 1991

[54] EDGE ENHANCEMENT METHOD AND APPARATUS FOR DOT MATRIX DEVICES

[75] Inventor: James C. Y. Lung, San Jose, Calif.

[73] Assignee: Destiny Technology Corporation, Milpitas, Calif.

[21] Appl. No.: 587,316

[22] Filed: Sep. 24, 1990

[51] Int. Cl.$^5$ .................... G06K 15/00; G06K 1/00
[52] U.S. Cl. .................................. 364/519; 364/518
[58] Field of Search ........................ 364/518–523, 364/235 MS, 237.2 MS, 927.2 MS, 927.67 MS, 930 MS; 346/154; 358/296, 298; 340/789, 798, 799, 800, 801

[56] References Cited

U.S. PATENT DOCUMENTS

| | | | |
|---|---|---|---|
| 4,321,610 | 3/1982 | Moore | 346/108 |
| 4,847,641 | 7/1989 | Tung | 346/154 |
| 4,888,584 | 12/1989 | Ando | 340/799 |

Primary Examiner—Arthur G. Evans
Attorney, Agent, or Firm—Rosenblum, Parish & Bacigalupi

[57] ABSTRACT

Edge enhancement method and apparatus for dot matrix devices wherein a group of gradient mask matrices are applied to a "current matrix", wherein a TBAP (To Be Adjusted Pixel) is surrounded by neighboring pixels, to determine if the TBAP is at a location where a change of brightness occurs. From this matrix operation, a conclusion is derived as to the existence or non-existence of an edge and the direction of the brightness change. The current matrix and a predetermined number of previously evaluated and yet to be evaluated pixels are then compared to a set of reference bit patterns which depict possible segment changes to be corrected. If the result indicates that the TBAP is on an edge of a changing edge segment, a corresponding code will be generated to modify the TBAP to enhance the smoothness of a segment transition. In the case of an electrophotographic printing machine, the specific code will change either the location or the size of the TBAP; whereas in the case of a monochrome screen display, the specific code will change the intensity of the TBAP.

22 Claims, 21 Drawing Sheets

FIG. 12

Brightness changes
←——————————→

EET EXAMPLE: VERTICAL SEGMENT

Jagged Examples (horizontal)
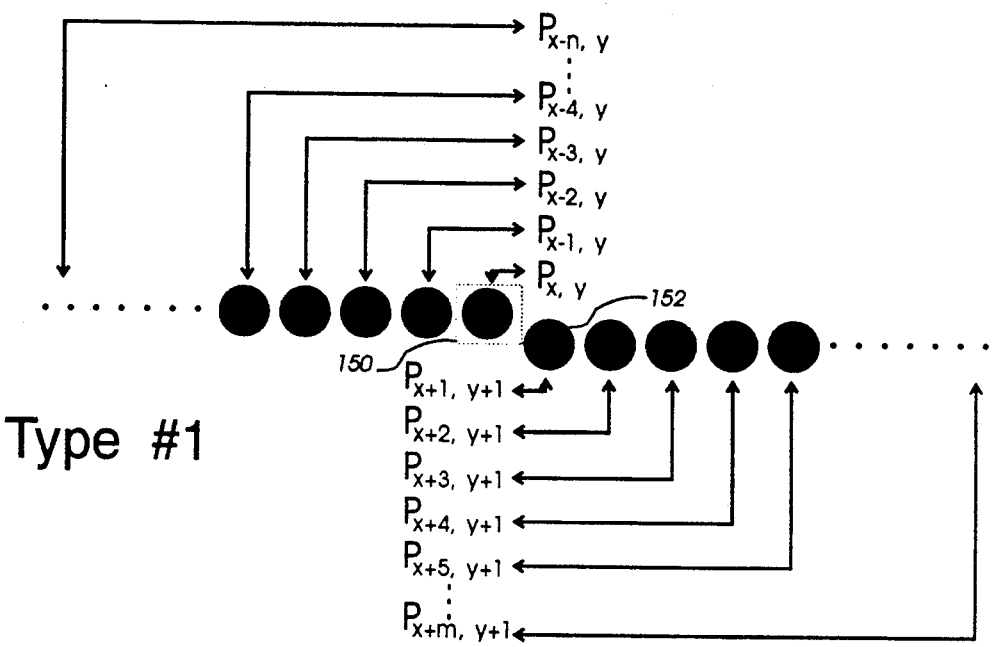
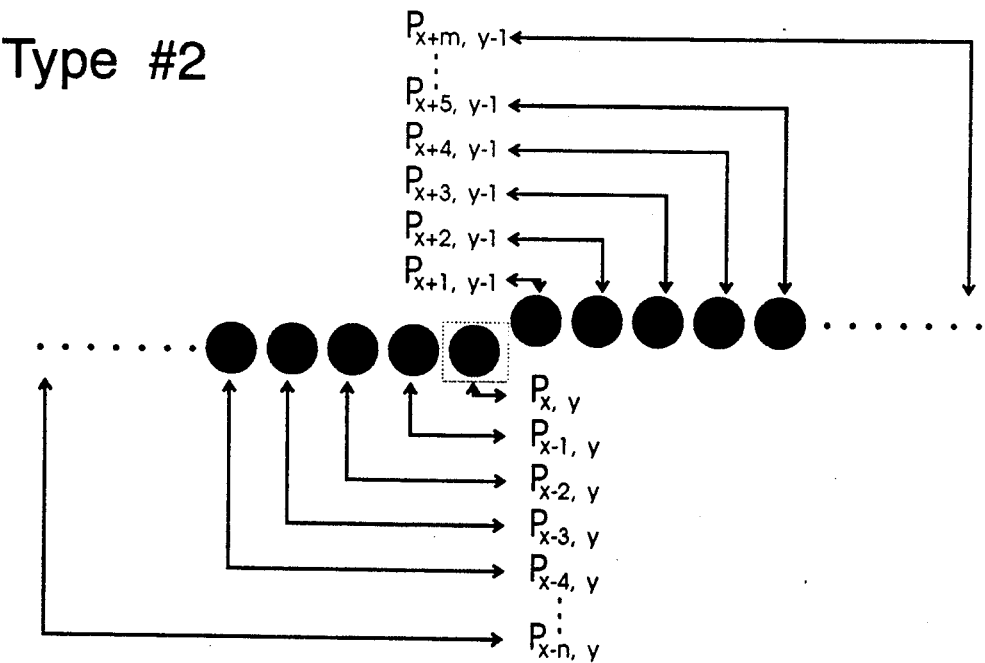
FIG. 5a

EET EXAMPLE: HORIZONTAL SEGMENT

FIG. 7a
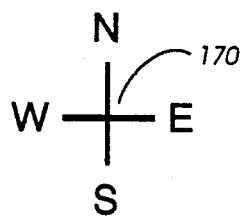
Gradient Mask
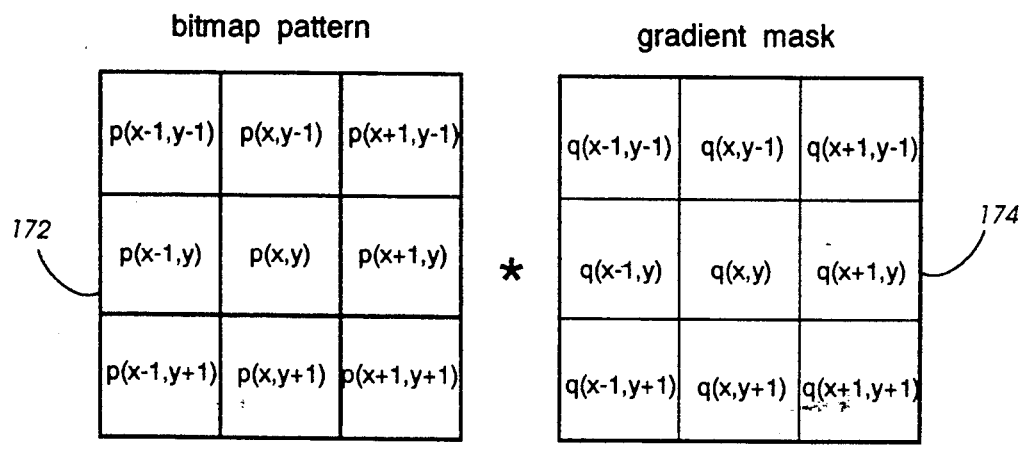
Whereas "*" denotes the spatial convolution operator
(bitmap pattern) * (gradient mask)
= p(x-1, y-1) • q(x-1, y-1) + p(x, y-1) • q(x, y-1) + p(x+1, y-1) • q(x+1, y-1)
+ p(x-1, y) • q(x-1, y) + p(x, y) • q(x, y) + p(x+1, y) • q(x+1, y)
+ p(x-1, y+1) • q(x-1, y+1) + p(x, y+1) • q(x, y+1) + p(x+1, y+1) • q(x+1, y+1)

Derived Weighted Gradient Mask Matrix Operation bitmap pattern      gradient mask

| 1 | 1 | 0 |
|---|---|---|
| 1 | 1 | 0 |
| 1 | 1 | 0 |

*

| 0 | 1 | -1 |
|---|---|----|
| 0 | 1 | -1 |
| 0 | 1 | -1 |

172    182    174

188

Rule:

1. (-1) denotes "inverter" in logic circuit, or NOT in boolean expression
2. (a • b) denotes (a AND b) in boolean expression
3. When b=(-1), (a • b) ⇒ (¬a)

186

Result from example above:

(1)•(0) + (1)•(1) + (0)•(-1) + (1)•(0) + (1)•(1) + (0)•(-1) + (1)•(0) + (1)•(1) + (0)•(-1)
= 0 + 1 + (¬0) + 0 + 1 + (¬0) + 0 + 1 + (¬0)
= 0 + 1 + 1 + 0 + 1 + 1 + 0 + 1 + 1
= 6

∴ Gradient toward East exists.
   This TBAP is defined to be on the East Segment (E-Seg).

GRADIENT MASK
(Examples of Vertical Segment)

| | Pattern | Gradient Mask | Detection Condition |
|---|---|---|---|
| 1. East Segment (E-Seg) | X 1 0 / X 1 0 / X 1 0 | 0 1 -1 / 0 1 -1 / 0 1 -1 | 6 |
| 2. East-SouthEast Segment (ESE-Seg) | X 1 0 / X 1 0 / 1 0 0 | 0 1 -1 / 0 1 -1 / 1 -1 -1 | 7 |
| 3. NorthWest-West Segment (NWW-Seg) | 0 0 1 / 0 1 X / 0 1 X | -1 -1 1 / -1 1 0 / -1 1 0 | 7 |

Note:

1. (-1) in Gradient Mask means "Inverter" in logic circuit.
2. * means spatial convolution.
3. X means "*don't care*" (either 0 or 1).
4. ⟶ means brightness change.

FIG. 8b

GRADIENT MASK
(Examples of Horizontal Segment)

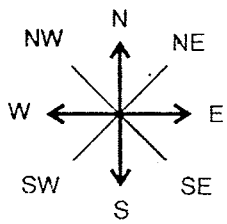

| | Pattern | | Gradient Mask | Detection Condition |
|---|---|---|---|---|
| 1. North Segment (N-Seg) | $\begin{array}{\|c\|c\|c\|} \hline 0 & 0 & 0 \\ \hline 1 & 1 & 1 \\ \hline X & X & X \\ \hline \end{array}$ | * | $\begin{array}{\|c\|c\|c\|} \hline -1 & -1 & -1 \\ \hline 1 & 1 & 1 \\ \hline 0 & 0 & 0 \\ \hline \end{array}$ | = 6 |
| 2. South-SouthWest Segment (SSW-Seg) | $\begin{array}{\|c\|c\|c\|} \hline 1 & 1 & X \\ \hline 0 & 0 & 1 \\ \hline 0 & 0 & 0 \\ \hline \end{array}$ | * | $\begin{array}{\|c\|c\|c\|} \hline 1 & 1 & 0 \\ \hline -1 & -1 & 1 \\ \hline -1 & -1 & -1 \\ \hline \end{array}$ | = 8 |
| 3. SouthEast-South Segment (SES-Seg) | $\begin{array}{\|c\|c\|c\|} \hline X & X & 1 \\ \hline 1 & 1 & 0 \\ \hline 0 & 0 & 0 \\ \hline \end{array}$ | * | $\begin{array}{\|c\|c\|c\|} \hline 0 & 0 & 1 \\ \hline 1 & 1 & -1 \\ \hline -1 & -1 & -1 \\ \hline \end{array}$ | = 7 |

Note:
1. (-1) in Gradient Mask means "Inverter" in logic circuit.
2. * means spatial convolution.
3. X means "*don't care*" (either 0 or 1).
4. ———▶ means brightness change.

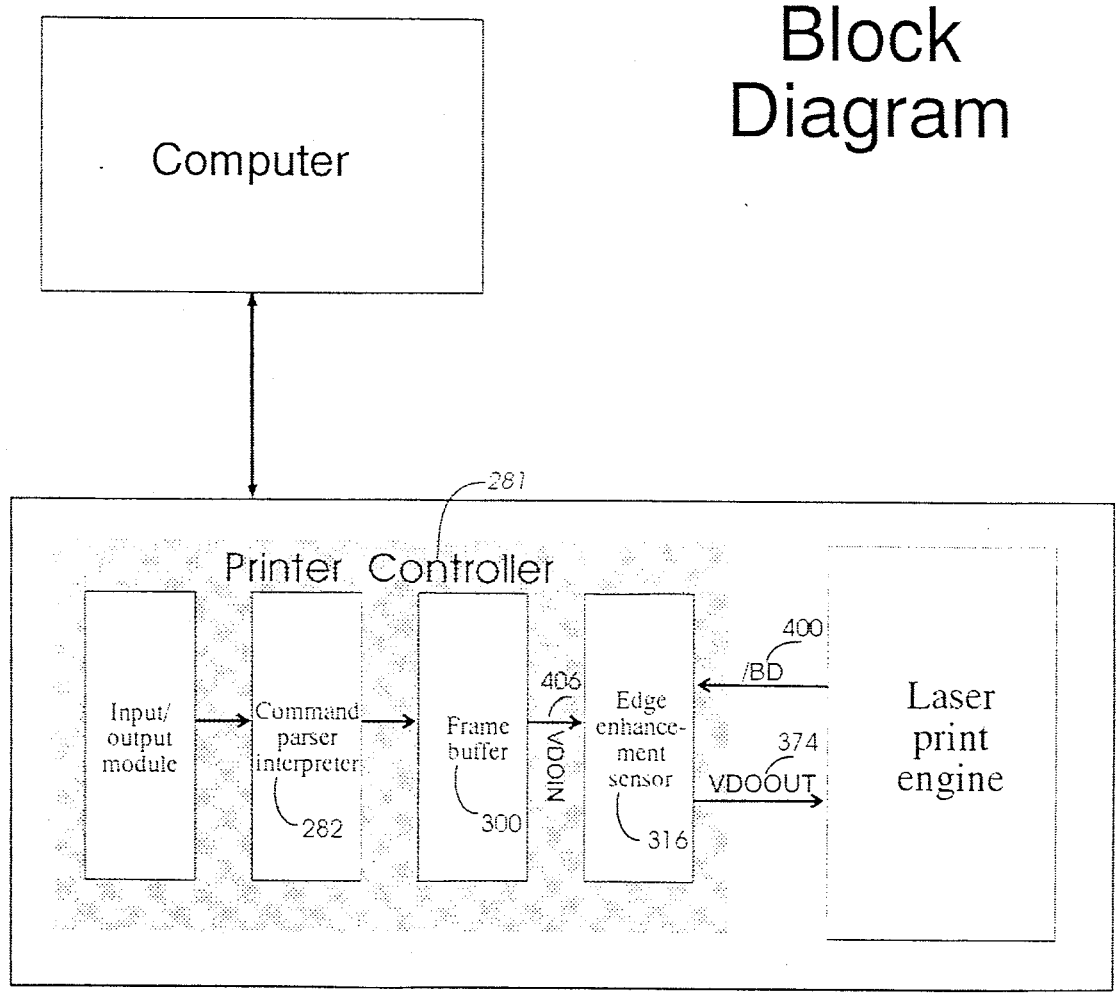

FIG. 11

EET EXAMPLE: VERTICAL SEGMENT

1. Select the TBAP location: x=10, y=3

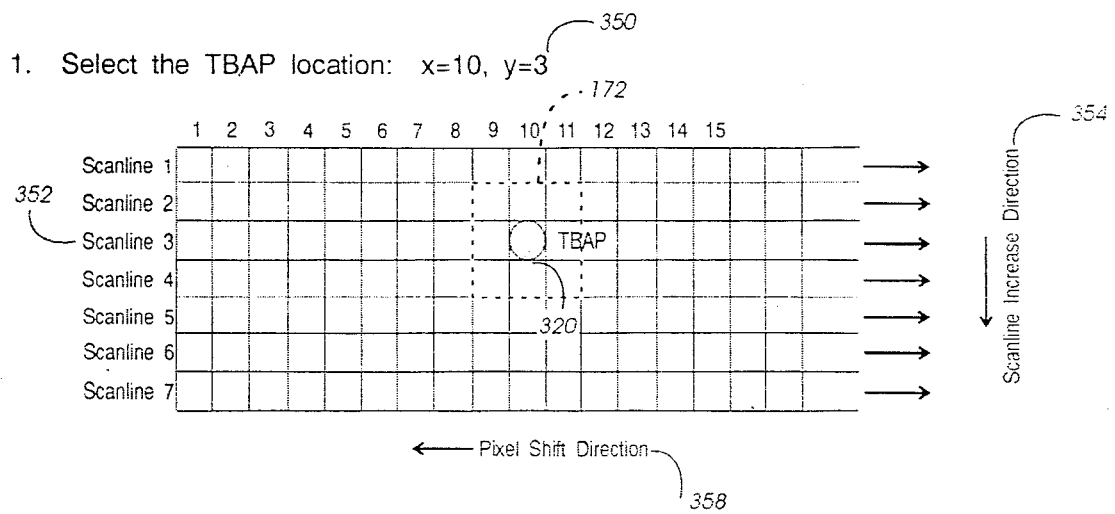

2. TBAP = 1, apply Gradient Masks to check if segment existing around TBAP.

3. Check the "segment change" in the range: (a) one more scan line in the past, (b) two more scan lines in the future, along the E-Seg direction.

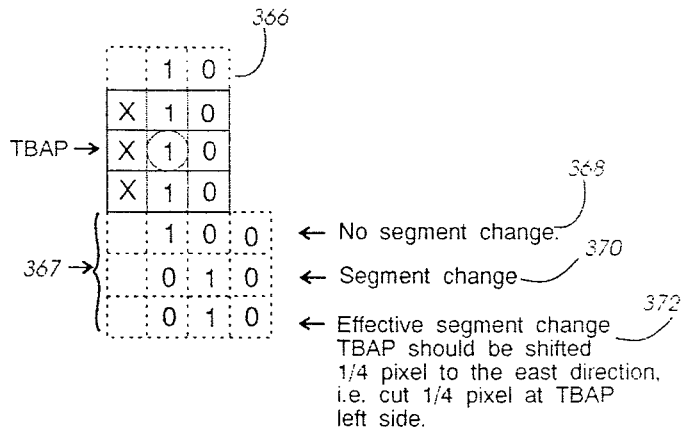

← No segment change
← Segment change
← Effective segment change TBAP should be shifted 1/4 pixel to the east direction, i.e. cut 1/4 pixel at TBAP left side.

4. Segment change being detected, generate a specific code to Address Generator based on the segment type and segment change location relative to TBAP location.

5. Address Generator encodes the specific code, generates address to Lookup ROM.

6. Lookup ROM outputs control signals to Modulation Logic.

7. Modulate TBAP according to the control signals.

Pulse Width Modulation Logic Diagram

One full-size dot is divided into 16 subdots.
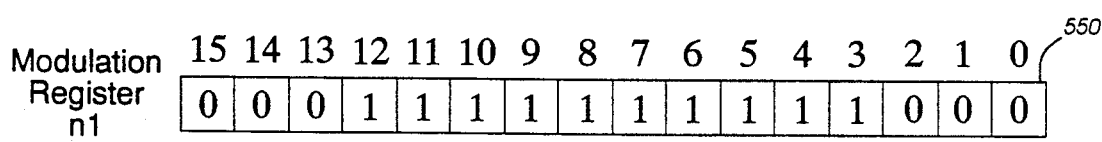
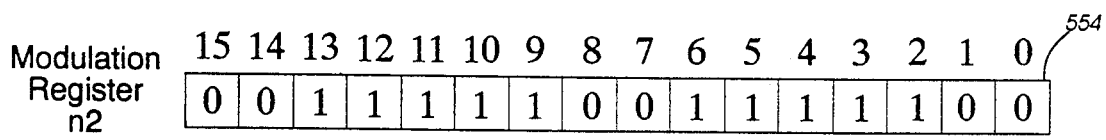
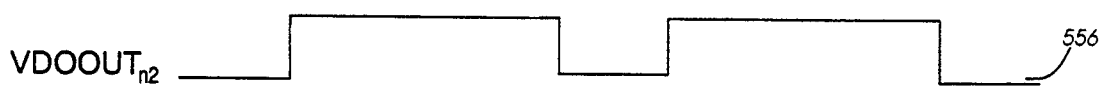
FIG. 14

Dot Modulation Registers 506

| Modulation Register | Instruction | Address Code | Item |
|---|---|---|---|
| Shift Left 1/4 Dot | MSL1/4 | 04h | 1 |
| Shift Left 2/4 Dot | MSL2/4 | 05h | 2 |
| Shift Left 3/4 Dot | MSL3/4 | 06h | 3 |
| Shift Right 1/4 Dot | MSR1/4 | 07h | 4 |
| Shift Right 2/4 Dot | MSR2/4 | 08h | 5 |
| Shift Right 3/4 Dot | MSR3/4 | 09h | 6 |
| (Light) Dot Size 1/4 | LDS1/4 | 0Ah | 7 |
| (Light) Dot Size 2/4 | LDS2/4 | 0Bh | 8 |
| (Light) Dot Size 3/4 | LDS3/4 | 0Ch | 9 |
| (Medium) Dot Size 1/4 | MDS1/4 | 0Dh | 10 |
| (Medium) Dot Size 2/4 | MDS2/4 | 0Eh | 11 |
| (Medium) Dot Size 3/4 | MDS3/4 | 0Fh | 12 |
| (Dark) Dot Size 1/4 | DDS1/4 | 10h | 13 |
| (Dark) Dot Size 2/4 | DDS2/4 | 11h | 14 |
| (Dark) Dot Size 3/4 | DDS3/4 | 12h | 15 |

FIG. 15

EDGE ENHANCEMENT METHOD AND APPARATUS FOR DOT MATRIX DEVICES

BACKGROUND OF THE INVENTION

1. Field of the Invention

This invention relates generally to apparatus and methods for controlling dot matrix output devices, such as cathode ray tubes and dot printing devices, to enhance edge representation when an image of an object is converted from graphical/mathematical format to display or print device format (a series of dots/pixels). More particularly, the present invention is directed to an improved implementation of weighted gradient work theory used to provide image edge transition smoothing in an efficient real time image enhancement system.

2. Brief Description of the Prior Art

In the field of image processing, research efforts have concentrated in the area of improving visual effects of object representation on output devices. Edges of original image objects, such as text, curves, boxes, and others, can be approximated by either linear or exponential equations. When these objects are digitized and converted into a matrix format which the output devices can accept, the integrity of the edges is usually compromised to fit the image objects into the device grids. The resulting staircase effects are quite visual to human perception in most of the commercially available products which have either low or medium resolutions.

However, the approximated appearance can be enhanced by locating the jagged edge segments and correcting the segment transition, or by increasing the device resolution to minimize the visual distortion to the degree that the naked eye can not differentiate the transition. However, increasing device resolution requires larger memory storage for the bitmap representation. The extra cost incurred by the memory is not desirable for general commercial products.

Moore et al U.S. Pat. No. 4,321,610 entitled "Dot Matrix Printer with Half Space Dot Capability", discloses a technique which utilizes a half-dot character memory matrix and a shift register to enhance edges by coupling a half dot with an edge dot. This method at best enhances the resolution by a factor of two at the expense of extra memory storage and emboldening result.

Tung U.S. Pat. No. 4,847,641 entitled "Piece-wise Print Image Enhancement for Dot Matrix Printers" discloses a template matching method to correct error cells. Tung's invention utilizes the more recent pattern recognition and template matching process generally known in the image processing field; it is by far the most efficient way to enhance jagged line appearance. However, template matching and the compensation cell method limits its feasibility to use in monochrome devices only. While gray scale devices may share many similarities with monochrome devices, Tung's method would not be able to identify different gray patterns.

In a recent study of image segmentation and improvement, reported in the textbook entitled *Digital Image Processing* by Rafael C. Gonzalez and Paul Wintz (Addison-Wesley Publishing Company, 1977), weighted gradient mask matrices are applied to identify segments of an object by detecting changes in brightness. Due to the nature of complex matrix multiplication, this approach is recommended for remote usage for military or research purposes where computation power is sufficient and time is not a concern, but never in real time applications where segment recognition and modification need to be accomplished before the next pixel is displayed or printed. However, it has been found that with selective entries in the gradient mask matrices, a simplified formula can be implemented in accordance with the present invention to use weighted gradient mask matrices to enhance the output of an electrophotographic printing machine or computer monitor display. Thus logical computation can be performed in the place of addition and multiplication to reduce the time required.

SUMMARY OF THE INVENTION

The present invention provides a technique to detect the presence of edges, and then to determine if the detected edge is part of a segment transition. Based on the finding, the edge is modified either by repositioning related dots, or by altering the dot size.

In accordance with the present invention, a group of gradient mask matrices are applied to a "current matrix", wherein a TBAP (To Be Adjusted Pixel) is surrounded by o neighboring pixels, to determine if the TBAP is at a location where a change of brightness occurs. From this matrix operation, a conclusion is derived as to the existence or non-existence a of an edge and the direction of the brightness change. The current matrix and a predetermined number of previously evaluated and yet to be evaluated pixels are then compared to a set of reference bit patterns which depict possible segment changes to be corrected. If the result indicates that the TBAP is on an edge of a changing edge segment, a corresponding code will be generated to modify the TBAP to enhance the smoothness of a segment transition. In the case of an electrophotographic printing machine, the specific code will change either the location or the size of the TBAP; whereas in the case of a monochrome screen display, the specific code will change the intensity of the TBAP. Thus, to the human eye, the altered segment transition is caused to appear less jagged than the unaltered representation. Ultimately this technique offers a visual effect equivalent to that provided by a higher resolution device without employing as much memory as would be required in the high resolution device.

This weighted gradient mask matrix approach preserves the integrity of image outlines and font design while improving the visual representation of all edges. The derived matrix operation uses AND and INVERTER logic for the matrix convolution process to eliminate CPU-intensive addition and multiplication calculations. Therefore, a system utilizing the present invention can achieve higher output quality in real time applications.

Furthermore, the present circuitry design provides a number of modulation registers for electrophotographic engine-specific, pulse-width/dot-size relationship. The present circuitry can also support an external ROM (Read Only Memory) or PAL (Programmable Array Logic) device to store additional information for fine-tuning the adjustments to be made in individual output devices. This modulized design extends the flexibility of this present circuitry, offers a general solution to serve various devices while it preserves the uniqueness of each electrophotographic machine.

IN THE DRAWING

Figure 2A:
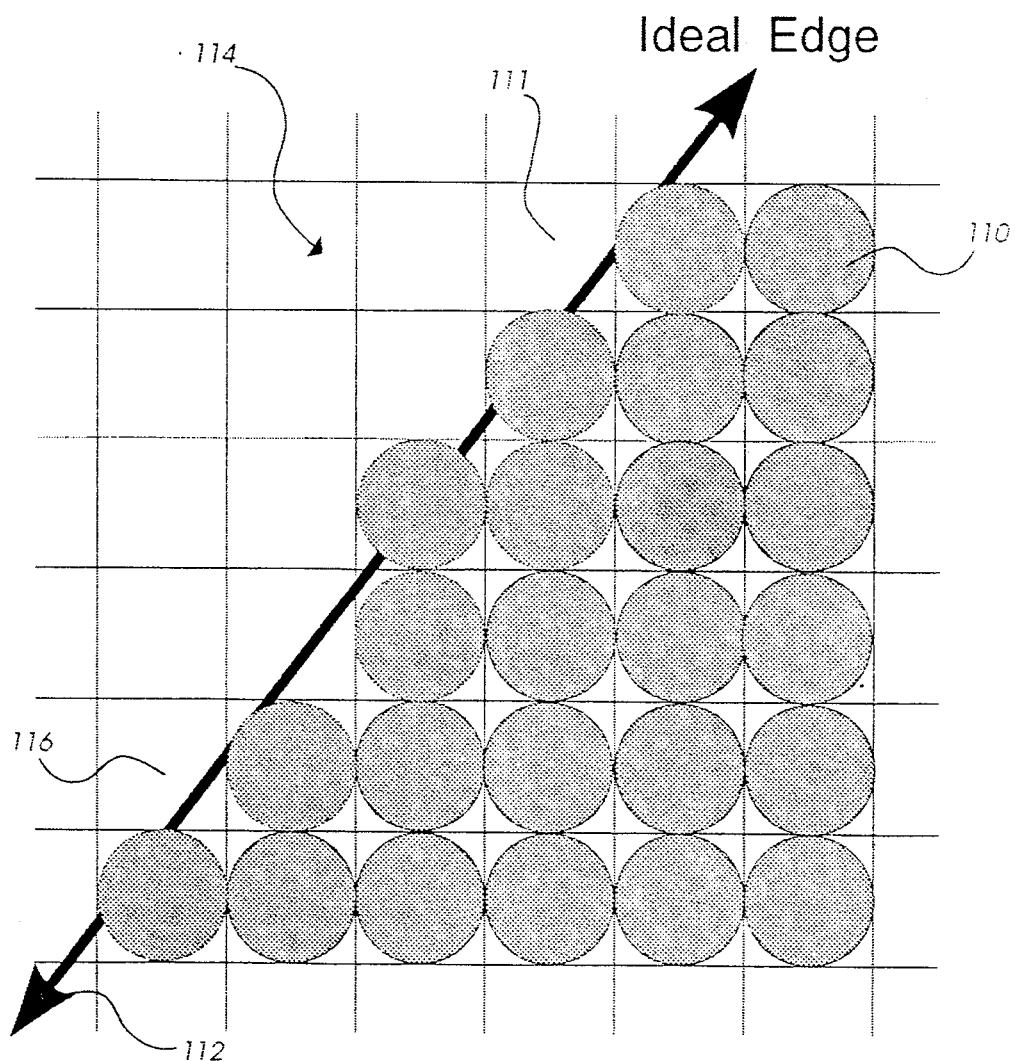
FIG. 2a is a diagram illustrating a prior art bitmap representation of an area after a "grid fitting" process. The round darker dots represent pixels that are turned "ON", whereas the lighter shaded area illustrates the brightness change as perceived by the human eye.
Figure 2B:
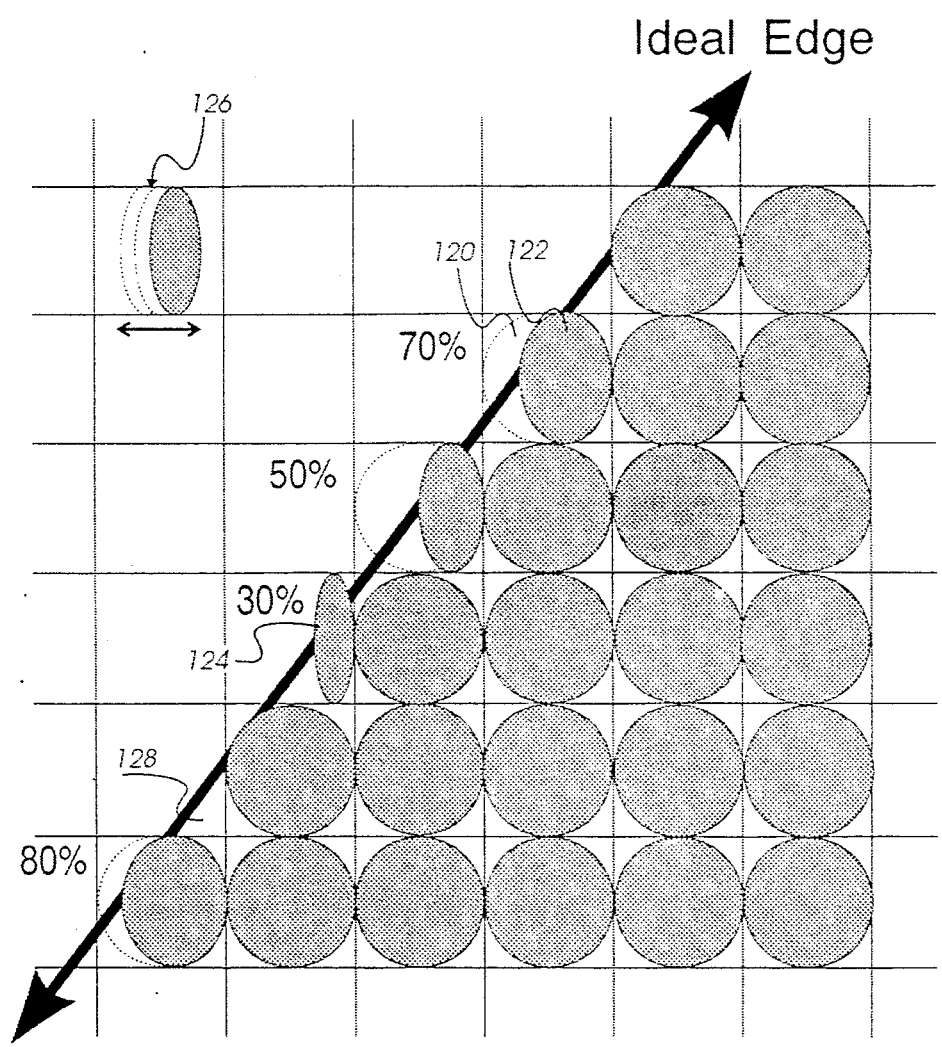

FIG. 2b is a diagram illustrating the bitmap representation of FIG. 2a after edge enhancement in accordance with the present invention. Dots ranging from 50%-80% which were turned "ON" as full dots in FIG. 2a, are now adjusted to enhance the smoother representation of the edge. The 30% dot, which in FIG. 2a a was not an "ON" pixel, is now adjusted to enhance the edge.

Figure 3A:
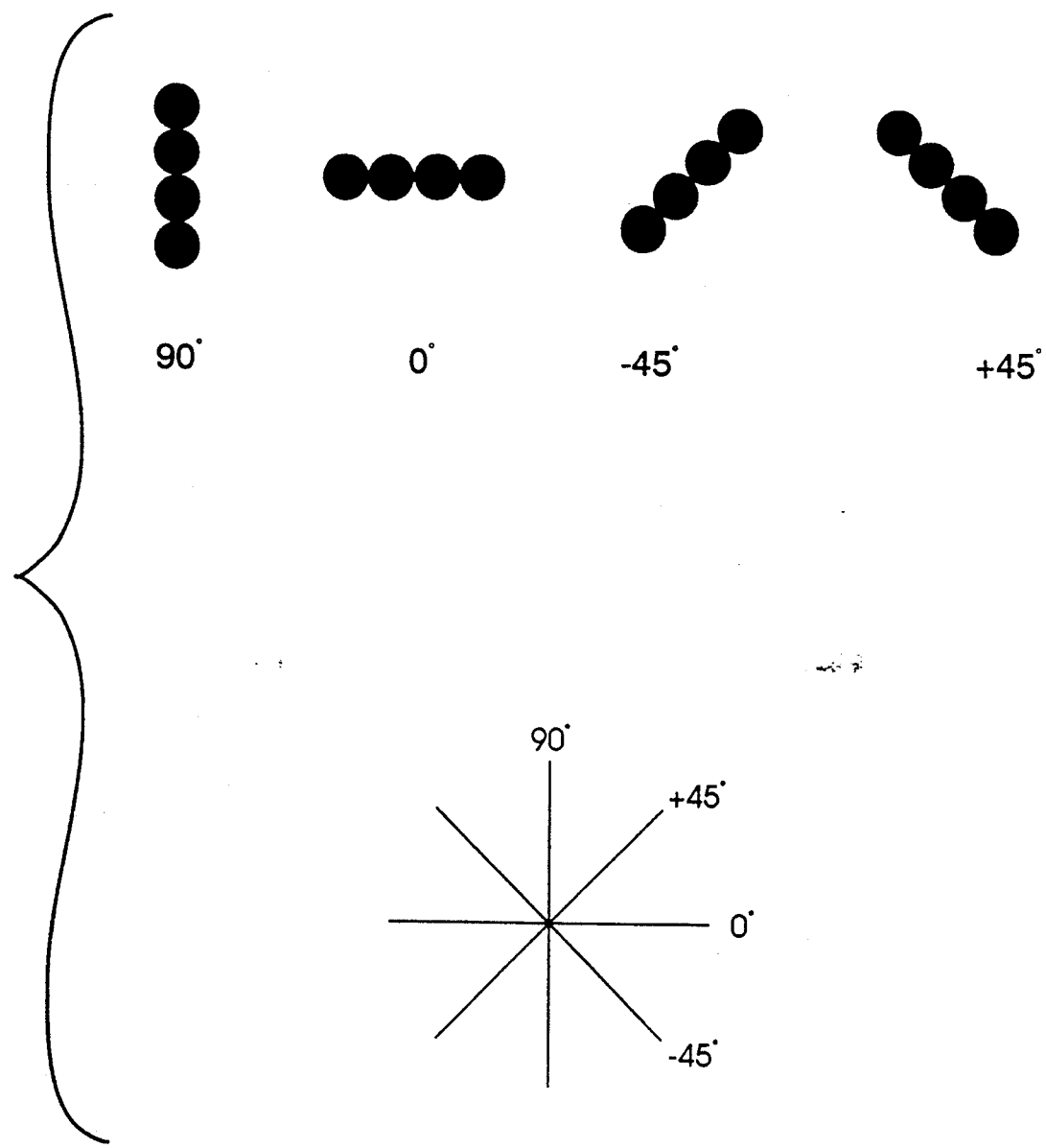

FIG. 3a outlines 4 possible slopes of defined "segments" in digital applications.

Figure 3B:
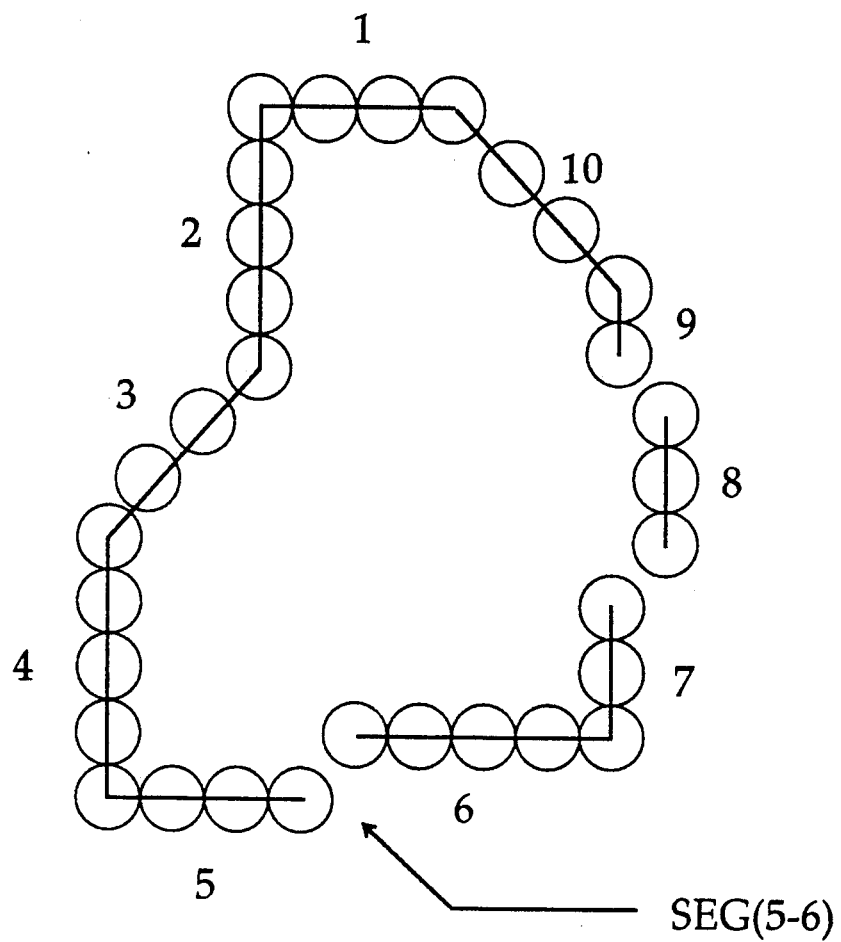

FIG. 3b illustrates an example of an object composed of a plurality of edge segments 1-10.

Figure 4A:
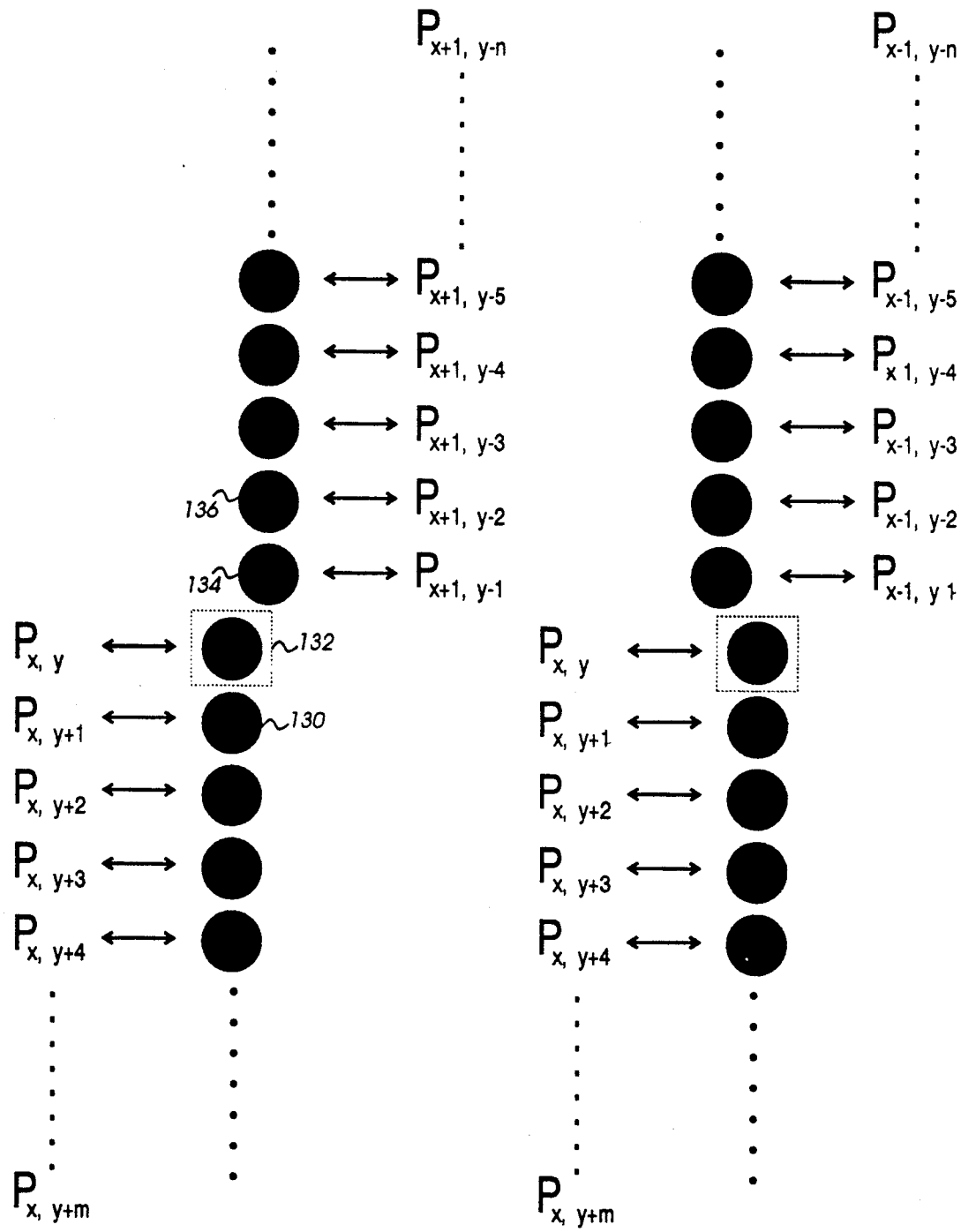

FIG. 4a is a diagram showing the mathematical definition of a "vertical edge segment" as used in the present invention.

Figure 4B:
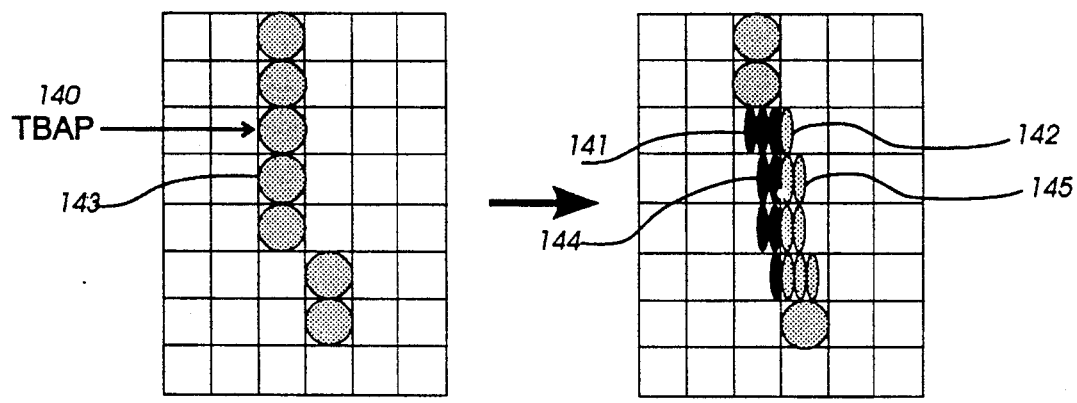

FIG. 4b shows an example of an unmodified step transition if a vertical edge segment and a corresponding edge-enhanced vertical segment.

Figure 5B:
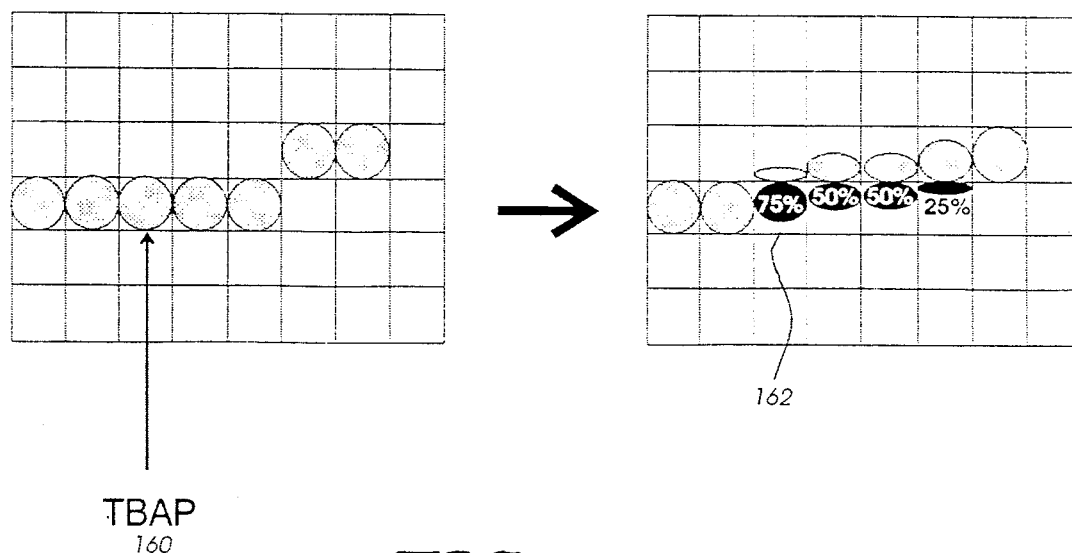

FIGS. 5a and 5b are diagrams illustrating "horizontal segments" as contrasted with the vertical examples depicted in FIGS. 4a and 4b.

Figure 6:
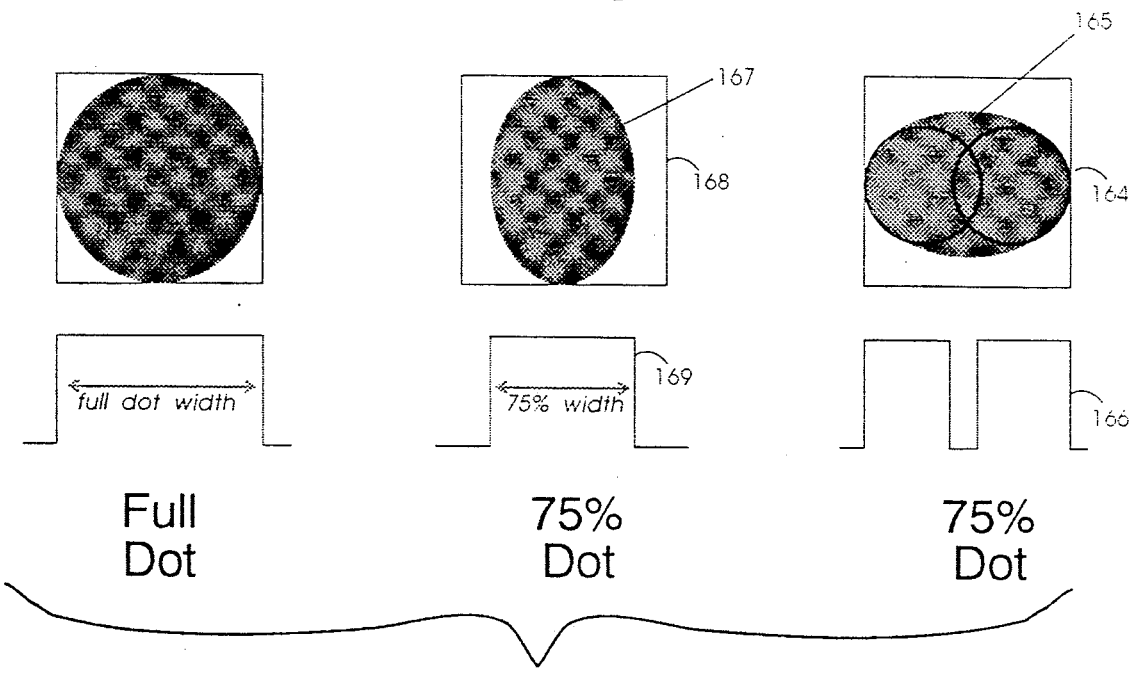

FIG. 6 illustrates how laser beam pulse manipulation can yield various results in a single pixel.

FIG. 7a illustrates the Gradient Mask convolution concept and the general formula applied in gradient mask matrix operation.

Figure 7B:
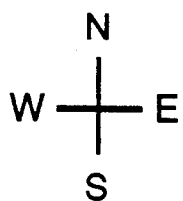

FIG. 7b illustrates the simplified, derived format of the weighted gradient mask, and the rules used in the present invention for edge detection.

Figure 8A:
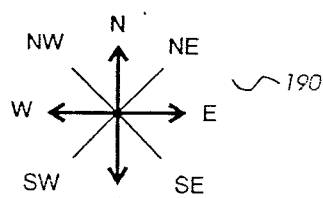

FIGS. 8a and 8b are examples of how the rules and formula are applied, and the results of derivation.

FIG. 9a is a block diagram illustrating the major building blocks of a laser printer controller.

Figure 9B:
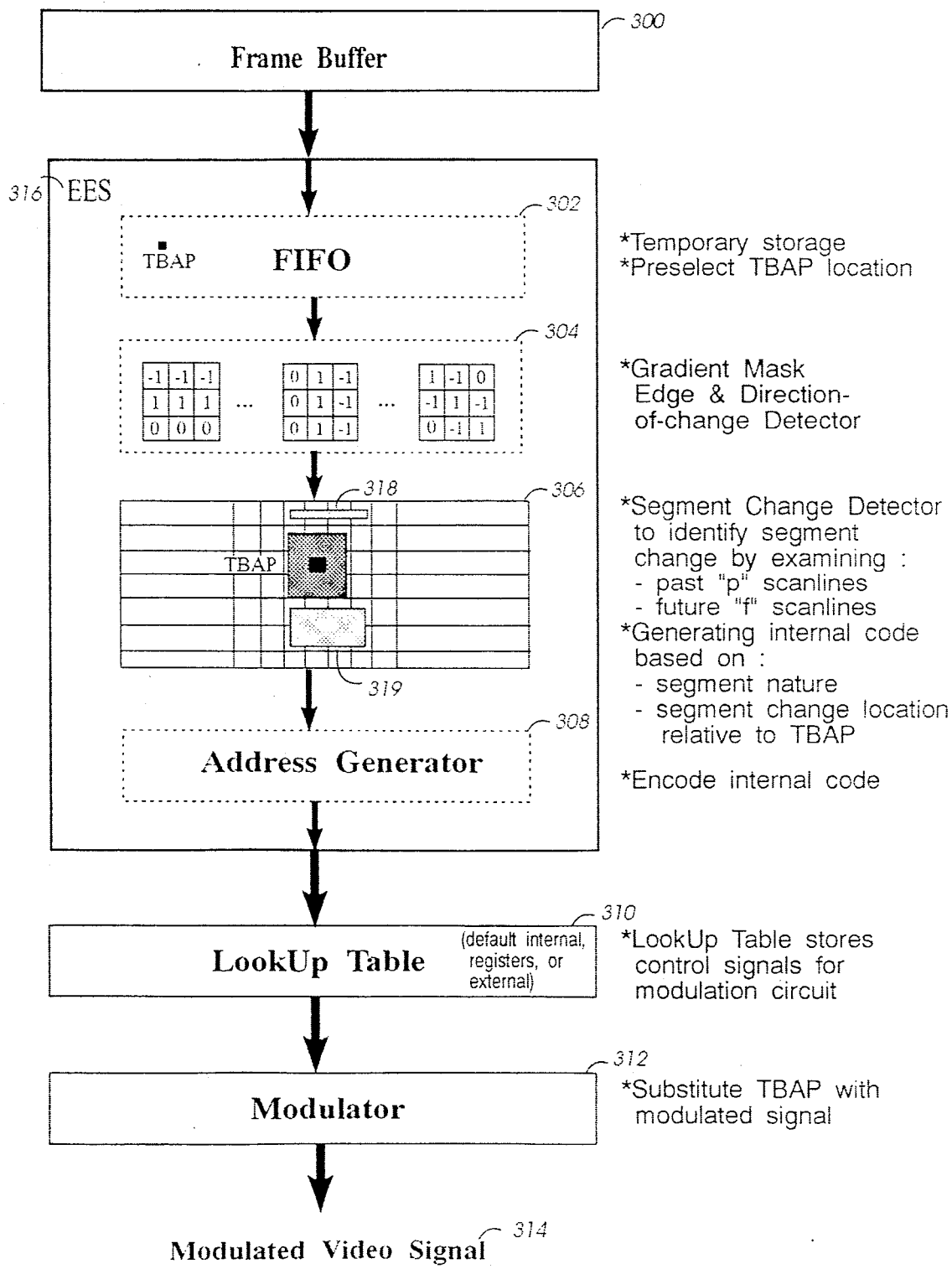

FIG. 9b is a block diagram illustrating the data flow within the circuitry and its associated components.

Figure 10:
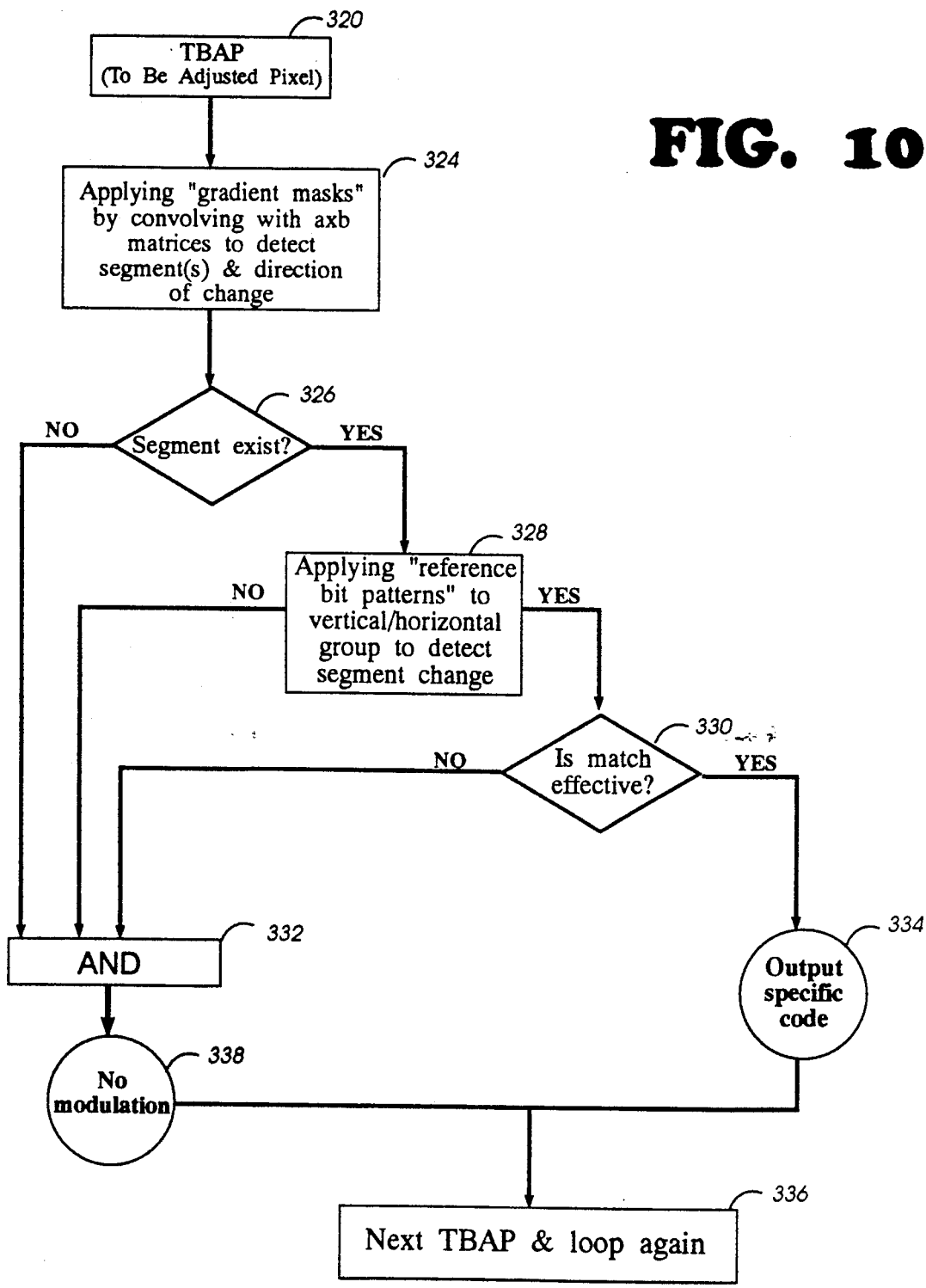

FIG. 10 is a logic flow chart depicting the segment detection and decision making process.

FIG. 11 shows an example of segment detection by examining the past and future trend of the current edge.

Figure 12:
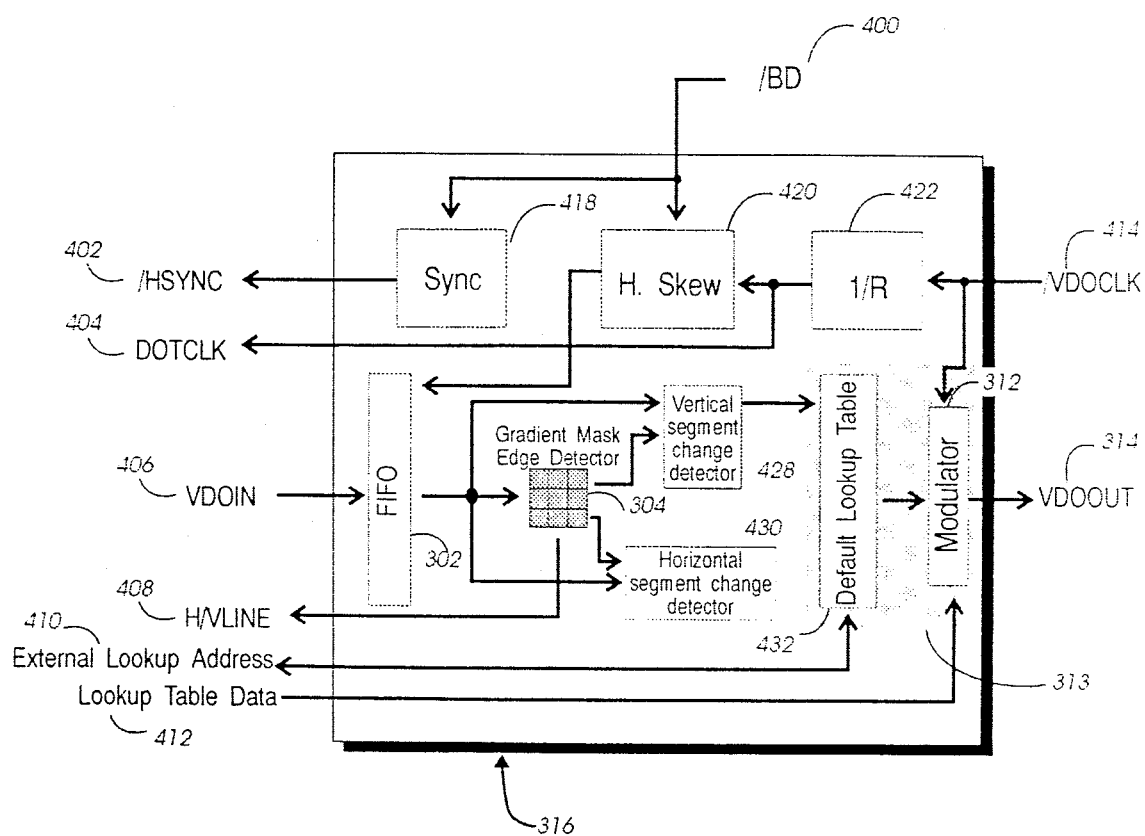

FIG. 12 is a chip design block diagram showing the relationship of edge enhancement circuitry and signals.

Figure 13:
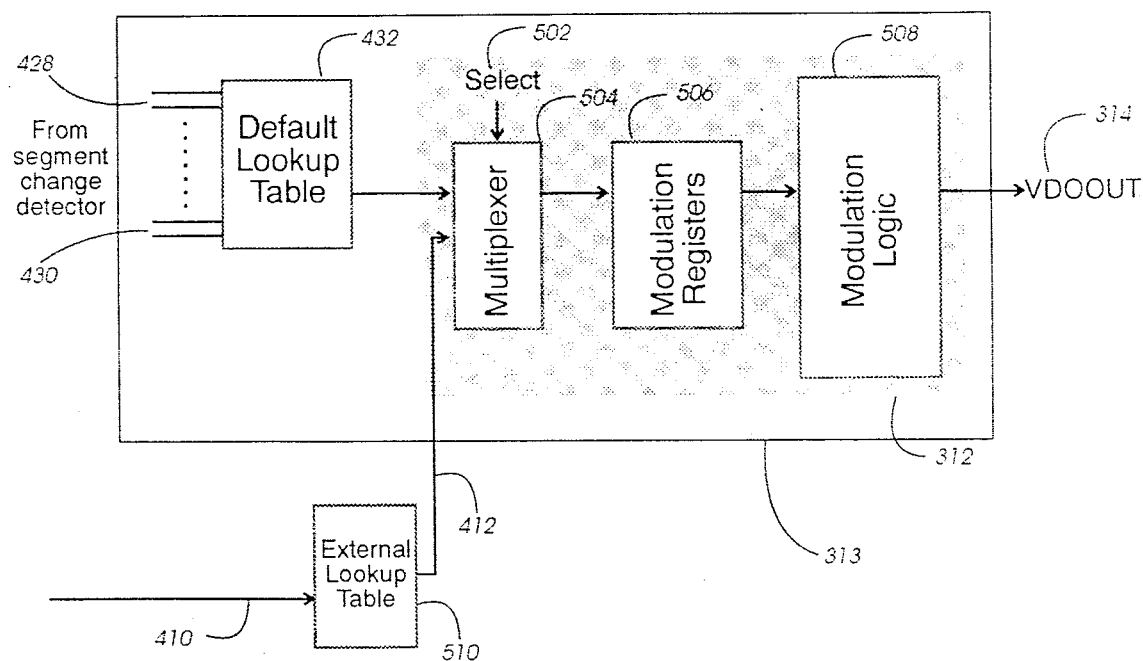

FIG. 13 shows the modulized structure within the circuitry design to support multiple output devices.

FIGS. 14 and 15 illustrate an example of how the present invention preserves the unique property of an individual electrophotographic printing machine under the general formula.

DETAILED DESCRIPTION OF THE PREFERRED EMBODIMENT

The present invention can be applied to various dot matrix devices, such as cathode ray tubes, electrophotographic printing machines, etc., to enhance the edge smoothness of the images generated or reproduced thereby. The particular apparatus described herein is an application specific integrated circuit (ASIC) for laser printers, realized by implementing the present invention. However, it is understood that the invention can be adapted for use in other dot matrix devices to enhance edge appearance using the same technique.

Dot matrix devices produce output in bitmap formats to be displayed on a CRT or printed on paper or other hard media. In the process of digitizing data into bit maps, a certain degree of loss in precision is inevitable. Furthermore, after the "grid fitting" process of putting the digitized data into the device framework, further data loss is introduced. Therefore, visible distortion in the final representation is normally found across the spectrum of the various types of low to medium resolution devices. Typically, the distortion is most obvious near edge transitions, where brightness changes from one level to the other.

Figure 1A:
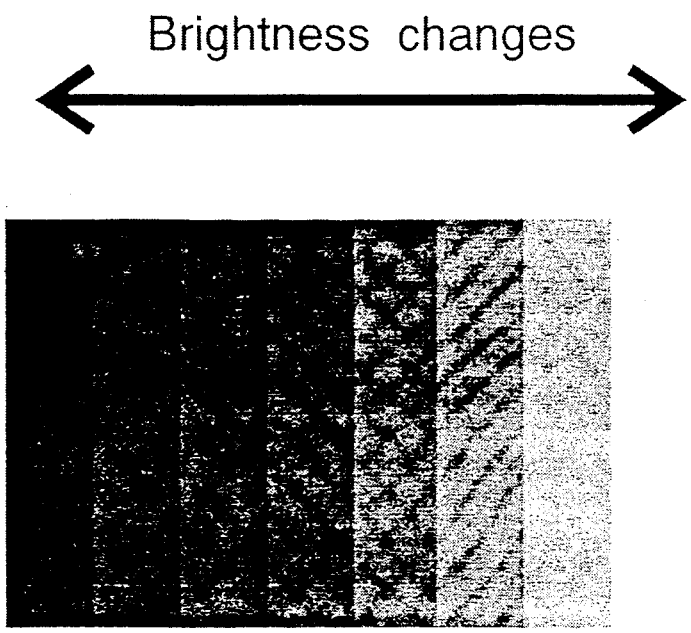
FIG. 1a illustrates a typical change in brightness and its visual effect.
Figure 1B:
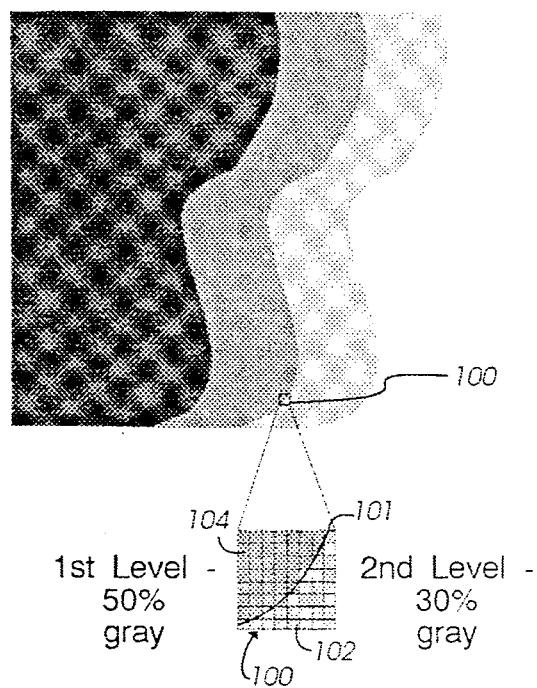
FIG. 1b illustrates the definition of an "edge" as a point in space where its value of brightness differs from its neighboring point.

The human eye is usually more sensitive to changes in color, shades, depths, than to a continuous area wherein no variation is present. FIG. 1a shows one example of an area including transitions between eight different shades. Looking briefly at this image, one will note that the eyes pay more attention to the edges where shades change than to any difference in shade. In FIG. 1b, a small square area 100 of a changing edge is enlarged to illustrate the edge 101 demarking a transition from a 30% gray level region 102 to a 50% gray level region 104. The small squares represent the device grids (pixels) with the ideal edge 101 passed through. An objective of the present invention is to adjust the final output, with all device limitations taken into consideration, so the near ideal edges are reproduced.

In a digitizing and grid fitting process as illustrated at 114, a dark object with a left edge inclined at an angle near 45° will be placed in the device frame to be displayed or printed, as shown in FIG. 2a. The actual, or ideal, edge 112 of this object is distorted in the process of bitmap conversion. More specifically, a pixel that has 50% or more of its area covered by the dark object is determined to be an "ON" bit, as depicted at 110 for example. However, a pixel having less than 50% of its area covered by the object is identified as an "OFF" bit, as depicted at 111. Thus, a printout or display of this representation forms a jagged edge rather than the straight edge 112. The lighter shaded area 116 in FIG. 2a represents the resulting shape of the object as perceived by the human eye. The present invention enhances the edge representation so that it appears substantially less jagged as depicted in FIG. 2b.

In accordance with the present invention, the jagged edge in FIG. 2a is adjusted by the insertion or substitution of various smaller dot sizes 122 to smooth the edge. The dotted lines 120 in FIG. 2b indicate where a full dot in FIG. 2a is now shrunk to a smaller size dot 122, and a 30% dot 124 is added to pad the area which normally would not have been an ON pixel. As illustrated at 126, the adjustable dot size of the present invention can vary from ½ to 1/32 of a full dot. By varying the dot size to enhance edges, as indicated at 128, a smoother edge representation can be achieved.

In accordance with the present invention, an edge segment is defined as a series of adjacent, aligned dots which collectively define a line having the same slope. There are four kinds of segments in a digital system: 90°, 0°, −45°, and 45°, as depicted in FIG. 3a. Any other slopes can not be represented perfectly in digital format without staircase distortion. The example illustrated in FIG. 3b, shows a contour which is composed of 10 segments 1-10.

In FIG. 4a, two types of transitions between segments are illustrated. Each type includes two vertically disposed but laterally displaced segments. Pixel dots $P_{x, y+1}$, 130 and $P_{x, y}$ 132 of FIG. 4a belong to the same 90° segment. Pixel dots $P_{x+1, y-1}$ 134 and $P_{x+1, y-2}$ 136 are likewise two pixels of a 5 dot segment. $P_{x, y}$ 132 and $P_{x+1, y-1}$ 134 form a segment change.

In a dot matrix device, all edges can be broken down into segments. One segment can comprise any number of dots. In FIG. 4a type #1 is a near straight vertical line. The mathematical model to represent the line is:

$$VL1(N,M)_{x,y} = \sum_{n=N}^{1} P_{x+1, y-n} + \sum_{m=0}^{M} P_{x, y+m}$$

In FIG. 4a type #2 represents the other possible vertical segment transition, which can be expressed as:

$$VL2(N,M)_{x,y} = \sum_{n=N}^{1} P_{x-1, y-n} + \sum_{m=0}^{M} P_{x, y+m}$$

Since a segment can be composed of any arbitrary number of dots, the following equation can be used to include all type 1 jagged vertical lines:

$$V1 = \Sigma\Sigma \, VL1(N,M)$$

And the summation of all type 2 can be expressed by:

$$V2 = \Sigma\Sigma \, VL2(N,M)$$

The equations for horizontal cases (FIG. 5a) are:

$$HL1(N,M)_{x,y} = \sum_{n=N}^{0} P_{x-n, y} + \sum_{m=1}^{M} P_{x+m, y+1}$$

$$HL2(N,M)_{x,y} = \sum_{n=N}^{0} P_{x-n, y} + \sum_{m=1}^{M} P_{x+m, y-1}$$

Similarly, the summation of all the type 1 and type 2 jagged horizontal lines can be expressed as:

$$H1 = \Sigma\Sigma \, HL1(N,M)$$

$$H2 = \Sigma\Sigma \, HL2(N,M)$$

The allowed input values for N and M determine the pixel input capacity of sampling circuit. In order to use the present invention in a real time application, N and M can not be too large.

To show how the equations work with the segment concept, FIG. 3b will be used as a reference. Let the notion of SEG(m-n) indicate the transition from an arbitrary segment #m to segment #n. The jagged SEG(5-6), SEG(7-8), and SEG(8-9) of FIG. 3b must be smoothed, while SEG(1-2), SEG(4-5) and SEG(6-7) are left alone. However, SEG(2-3), SEG(3-4), SEG(9-10), and SEG(10-1) are optional to the implementation. The above equations can be applied to detect these segment changes with some appropriate N and M values.

In the present invention, an Edge Enhancement Sensor (EES), to be further described below, is implemented to locate and improve edges. Within the EES structure, a Segment Change Detector (SCD) is used to determine if there is any change about a current pixel by tracing the history and the future of each segment. The above equations are embedded in the Segment Change Detector system to evaluate the edge condition.

Once a segment change is detected and this change is determined to be an effective change, such as SEG(5-6) in FIG. 3b, then an appropriate modulation signal will be generated to modify the TBAP by changing its width, height, or both. In FIG. 4b, the TBAP 140 is on the edge of a changing segment. It is thus replaced by three ¼ subdots 141 and coupled with another ¼ subdot 142 for its adjacent pixel. Therefore, to the human eye, a full size dot appears to be shifted to the right a distance equal to ¼ of a regular pixel width. Similarly when the next line is evaluated and pixel dot 143 becomes the TBAP, it is replaced by two ¼ width subdots 144 and two additional ¼ width subdots 145 are added to the adjacent pixel. This gradual movement of dots and subdots thus provides the intended edge enhancement.

FIGS. 5a and 5b illustrate the horizontal example of segment detection and edge enhancement. In FIG. 5b, the TBAP 160 is modified to provide a 75% dot visual effect with one full pixel width and smaller height. Whereas pulse width modulation can be used to modify the width of a pixel dot, as illustrated at 167 in FIG. 6, to achieve a flatter dot in a laser printer, two signal pulses 166 which in combination give the desired energy level are used in the place of one pixel signal. For example, in FIG. 6 two smaller dots 164 overlapping each other create the illusion of a single flat dot 165. Due to the characteristics of the laser printer drum mechanism, the two narrow pulses 166 not only shrink the width of each dot 164 but also the height thereof. However, if the energy level peaks through the threshold, a shorter than full width pulse 169 still yields the full height dot 168.

All prior art resolution enhancement or edge improvement systems use similar architecture approaches: first they locate the trouble area, then they improve the situation. In accordance with the present invention, the equations mentioned above serve to define segments while weighted gradient masks determine the directions of changes.

A Gradient Mask is an a×b matrix wherein a and b are integers and particular weights are given to a pre-determined matrix of bit cells, so that a particular type of gradient change can be identified. Gradient changes introduce edges. Thus the present invention is applied to enhance edges.

The mathematical way to apply a weighted gradient mask 174 (FIG. 7a) to a particular matrix or bitmap pattern 172 is not the standard matrix operation. Instead, the two matrices are convolved by a convolution operator as described in FIG. 7a. Specifically, the value of each cell in the first matrix is multiplied by the value of the cell in the same location of the second matrix. The sum of the multiplications then yields a value which can be used to determine the direction of the gradient. The entries for each cell of the subject matrix can be numbers that represent different colors, intensities, or gray shades. The entries for the cells of the gradient masks are numbers which carry different weights to distinguish various gradients.

In the present apparatus, an ASIC (application specific integrated circuit) for laser printers, only needs to handle black and white. Since black and white are two discrete levels and there is nothing inbetween, 1 and 0 are respectively used to represent a black, or "ON", pixel and a white, or "OFF", pixel. Rather than using complex multiplication, a new weighted gradient mask operation is derived to use boolean operations as illustrated in FIG. 7b. Thus the calculations are narrowed down to just boolean AND and NOT operations as expressed at 188 to extract the gradient features that used to be used in the standard convolution methodology. The circuitry is also simplified. The result is that the method in the present invention can now be implemented in real time applications which were previously considered inapplicable in prior art systems.

The detailed flow is carried through by using the example in FIG. 8a. Suppose segment condition of the current pattern 172 (a 3×3 pixel matrix) to be determined is convolved with a particular gradient mask 174 which is configured to detect an East Segment (E-Seg), ie., a segment transitioning from dark to light in the East or right side direction. Each pre-determined gradient mask has an ideal number associated with it which indicates detection of a segment having a corresponding condition. If the associated ideal number results from the application of a particular gradient mask, then the particular condition 194 is identified, that is, the direction of the gradient change of a current pattern is detected. Since each gradient mask has at least some 0s to offset certain insignificant cells 202, the notation "X" is used. These "X" cells can have either 0 or 1 values, which will make no difference in the outcome, because the 0s in the gradient mask would not offer any weight to them. In order to determine if the 0s and 1s form the tested for gradient, a "−1" notation is introduced (as shown at 200) as a NOT in the boolean expression. Any cell in the current pattern matrix which is operated upon by the "−1" will be inverted. Thus, only 0s in the current pattern matrix will contribute weight when operated upon by "−1" s. Should the resulting weight be less than the ideal number associated with the particular gradient mask, then no match will be found and the current pattern will be tested against another in the set of pre-determined gradient masks stored in the present apparatus. FIGS. 8a and 8b show only a subset of those gradient masks used in the apparatus to detect the horizontal and vertical transitions. It is to be understood however that in accordance with the present invention a complete set of predetermined gradient masks can be executed concurrently.

FIG. 9a is a simplified block diagram outlining the principal functional components of a laser printer and its controller 281. As is well understood in the art, after the laser printer interpreter 282 has parsed and processed the symbolic page objects, the physical page is converted into bitmap format and temporarily stored in the frame buffer 300. The frame buffer 300, as is more clearly shown in FIG. 9b, shifts out the bits to Edge Enhancement Sensor (EES) 316 so that they can be monitored for edge enhancement. The incoming bit stream is stored in a temporary storage, a first-in-first-out (FIFO) memory buffer 302 (FIG. 9b). Within this buffer, a predetermined bit location is assigned as the TBAP (to-be-adjusted-pixel). This TBAP is in the center of a 3×3 pattern matrix which will be convolved in a gradient mask edge detector 304 with a set of gradient mask matrices to detect the existence of an edge segment. The result of the convolution also indicates the direction of gradient change, and based on the direction given, the bit pattern matrix is classified as either a horizontal or vertical pattern. A horizontal pattern is one which includes a horizontal edge segment. A vertical pattern is one which includes a vertical edge segment. In accordance with the present invention, horizontal and vertical groups are also defined. A horizontal group includes a horizontal pattern, a predetermined number of previously evaluated bits (pixels) (366 in FIG. 11) and a predetermined number of yet to be evaluated bits (pixels) (367 in FIG. 11). Horizontal and vertical sets of reference bit patterns, each pattern of which includes a pattern of bits corresponding to one possible combination of bits aligned in one or more segments, are also provided for. Once the pattern matrix is determined to be either vertical or horizontal and its corresponding group is identified, the HLINE or VLINE 408 (FIG. 12) is activated accordingly, and a comparison is made by either vertical detector 428 or horizontal detector 430. All reference bit patterns in a particular group are simultaneously compared bit by bit to the bits of the group including the present pattern matrix, the previously evaluated bits 366 and the yet to be evaluated bits 367. The comparison will decide if the TBAP needs to be modified. If a modification is required for this TBAP, the address generator 308 (FIG. 9b) generates an address code identifying where the associated modulation instruction resides. The modulation instruction is then processed by the modulation logic 312 to alter the original signal and output a modulated video signal 314. If there is no match found during the group comparison operation, then there is no modulation required. FIG. 10 shows the logical decision making process.

Most laser printers are similar in their mechanism and functions, although the relationship of laser beam mechanism and drum varies somewhat from different engine models and manufacturers. The present invention and apparatus offers the flexibility of supporting multiple output devices and their unique pulse-width/dot size relations by allowing an external ROM or PAL device to be included in Look Up Table 310. This external ROM/PAL device can store more modulation instructions than the existing apparatus to give some laser driving engines further precision control, while still keeping the cost low for most engines having near standard characteristics.

To synchronize the process so that all edge enhancement steps for one TBAP can be accomplished in real time before the next pixel arrives, the present apparatus outlined in FIG. 12 accepts on input 400 the /BD (beam detector) signal from the engine, as well as the /VDOCLK (video clock) input on line 414. Since the same clock source is needed to synchronize the printer controller functions, /HSYNC (horizontal sync. signal) input at 402 and DOTCLK input at 404 are passed to the printer controller 281 (FIG. 9a). The /VDOCLK signal 414 has R times higher frequency than DOTCLK 404 which is used by the printer controller, the /VDOCLK 414 is thus divided by R in divider 422 to give the DOTCLK signal the correct frequency. The value of R is a variable which will be used to divide a full size dot by 2R. For example, if R=5, then one full size dot can be divided into 10 subdots for various combinations. The practical integers for dividers for this kind of application are from 1 to 16, which will yield subdot size from ½ to 1/32. However, the bigger the divider, the higher the resolution and video frequency.

The video image data VDOIN signal 406 is passed from the printer controller and stored temporarily in the FIFO 302. The current pattern matrix with the TBAP is then convolved at 304 with the gradient masks to effect edge detection and is then compared with either the vertical group or horizontal group of data in detectors 428 and 430, respectively. There is a predefined lookup table 432 built into the present apparatus for the appropriate modulation code associated with the current condition. Furthermore, as mentioned earlier, an external lookup device (addressed via line 410) can be attached for more flexibility. The instruction code of the desired modulation from either the default lookup table 432 or the external lookup (input on line 412) table is then input to the modulator subsystem 312.

Referring now to FIG. 13, the modulator 312 receives at least one input, or perhaps two if an external lookup table ROM/PAL is installed, which are input to the multiplexer 504 to generate a resulting code for input to modulation registers 506. The modulation registers 506 are programmable registers which can be initialized by the printer controller at power-on time. The data stored in these registers are implementation dependent. For example, as shown in FIG. 14, two sample registers can have different signal combinations 550-556 stored therein. This example illustrates the case wherein one dot is divided into 16 subdots by setting R in the divider 422 (FIG. 12) to 8. Each modulation register in 506 (FIG. 13) is indexed by the instruction input thereto from the multiplexer 504 and an associated address code which points to the desired signal location to use (see FIG. 15). The desired signal will replace the original TBAP signal in the modulation logic 508 and send out the final modified video signal (VDOOUT) on line 314.

Although the present invention has been described above in terms of an apparatus for enhancing the output of a laser printer, it will be understood by those skilled in the art that the present invention can likewise be implemented to control the intensity of the cathode ray beam, or beams, in a video display device or similar apparatus. It is therefore intended that the appended claims be interpreted to cover all alterations, modification and applications that fall within the true spirit and scope of the invention.

What I claim is:

1. A method for enhancing the displayed image of a print or display apparatus, comprising the steps of:
    generating a set of gradient masks each of which represents a plurality of edge segment transition conditions and includes a matrix of axb cells each cell of which is assigned a numerical weight corresponding to the relative lightness or darkness of the corresponding pixel of an image having an edge segment passing through a center pixel of the matrix;
    generating a bit data signal including a plurality of data bits representative on a pixel by pixel basis of a bit map image to be printed or displayed;
    storing in temporary storage means a predetermined number of consecutive bits in a predetermined number of consecutive lines of said bit map image;
    selecting subsets of said bits forming a sample matrix of axb bits, the central bit of each sample matrix being a candidate for modification;
    convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;
    generating a set of reference bit patterns each of which includes a sub-pattern of bits corresponding to one possible combination of bits of the same data state aligned in one or more edge segments, said pattern including an axb matrix of bits, a first predetermined number of bits disposed adjacent one side of said matrix, and a second predetermined number of bits disposed adjacent another side of said matrix;
    comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;
    generating for each match found to a reference pattern including a predetermined type of segment transition, a modification signal for modifying the central bit of said sample matrix dependent upon the type of transition detected; and
    using said modification signal to cause the print or display apparatus to develop a corresponding output.

2. A method for enhancing the displayed image of a print or display apparatus as recited in claim 1 wherein the convolving of each said sample matrix with each said gradient mask is accomplished using boolean algebra.

3. A method for enhancing the displayed image of a print or display apparatus as recited in claim 1 wherein a is equal to 3 and b is equal to 3.

4. A method for enhancing the displayed image of a print or display apparatus as recited in claim 1 wherein during said convolution step all said gradient masks are simultaneously convolved with the sample matrix.

5. A method for enhancing the displayed image of a print or display apparatus as recited in claim 1 wherein during said comparison step a subset of said reference bit patterns is simultaneously compared to said sample matrix and its said previously and yet to be evaluated adjacent bits.

6. A method for enhancing the displayed image of a display apparatus as recited in claim 1 wherein said modification signal causes the dot normally representing the central bit to be replaced by one or more subdots having special characteristics different from the dot replaced.

7. A method for enhancing the displayed image of a print or display apparatus as recited in claim 6 wherein said subdots change the apparent width and/or height of the dot replaced.

8. A method for enhancing the displayed image of a print or display apparatus as recited in claim 2 wherein a is equal to 3 and b is equal to 3.

9. A method for enhancing the displayed image of a print or display apparatus as recited in claim 2 wherein during said convolution step all said gradient masks are simultaneously convolved with the sample matrix.

10. A method for enhancing the displayed image of a print or display apparatus as recited in claim 2 wherein during said comparison step a subset of said reference bit patterns is simultaneously compared to said sample matrix and its said previously and yet to be evaluated adjacent bits.

11. A method for enhancing the displayed image of a print or display apparatus as recited in claim 4 wherein during said comparison step a subset of said reference bit patterns is simultaneously compared to said sample matrix and its said previously and yet to be evaluated adjacent bits.

12. A method for enhancing the displayed image of a display apparatus as recited in claim 2 wherein said modification signal causes the dot normally representing the central bit to be replaced by one or more subdots having special characteristics different from the dot replaced.

13. A method for enhancing the displayed image of a display apparatus as recited in claim 4 wherein said modification signal causes the dot normally representing the central bit to be replaced by one or more subdots having special characteristics different from the dot replaced.

14. A method for enhancing the displayed image of a display apparatus as recited in claim 5 wherein said modification signal causes the dot normally representing the central bit to be replaced by one or more subdots having special characteristics different from the dot replaced.

15. A method for enhancing the displayed image of a print or display apparatus as recited in claim 14 wherein said subdots change the apparent width and/or height of the dot replaced.

16. Apparatus for enhancing the output of a print or display device which produces a digitized image in dot matrix format, comprising:
   means for generating a set of gradient masks each of which represents a plurality of edge segment transition conditions and includes a matrix of axb cells each cell of which is assigned a numerical weight corresponding to the relative lightness or darkness of the corresponding pixel of an image having an edge segment passing through a center pixel of the matrix;
   means for generating a bit data signal including a plurality of data bits representative on a pixel by pixel basis of a bit map image to be printed or displayed;
   storage means for temporarily storing a predetermined number of consecutive bits in a predetermined number of consecutive lines of said bit map image;
   means for selecting subsets of said bits forming a sample matrix of axb bits, the central bit of each sample matrix being a candidate for modification;
   means for convolving each said sample matrix with each said gradient mask to detect those sample matrix having an edge segment passing through their central bit, said edge segment being defined as a series of adjacent aligned data bits of the same data state forming a straight line having a single slope, and to determine the direction of a gradient change;
   means for generating a set of reference bit patterns each of which includes a sub-pattern of bits corresponding to one possible combination of bits of the same data state aligned in one or more edge segments, said pattern including an axb matrix of bits, a first predetermined number of bits disposed adjacent one side of said matrix, and a second predetermined number of bits disposed adjacent another side of said matrix;
   means for comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;
   means for generating, for each match found to a reference pattern including a predetermined type of segment transition, a modification signal for modifying the central bit of said sample matrix dependent upon the type of transition detected; and
   means responsive to said modification signal for causing the print or display apparatus to develop a corresponding output.

17. Apparatus for enhancing the output of a print or display apparatus as recited in claim 16 wherein said means for convolving includes
   edge detector means for detecting the existence of an edge segment in a sample matrix, and
   segment change detection means for detecting a segment change within the sample matrix.

18. Apparatus for enhancing the output of a print or display apparatus as recited in claim 17 wherein said segment change detector includes vertical segment change detecting means and horizontal segment change detecting means.

19. Apparatus for enhancing the output of a print or display apparatus as recited in claim 16 wherein said means responsive to includes modulation logic means for modulating the display drive signal of said print or display device.

20. Apparatus for enhancing the output of a print or display apparatus as recited in claim 19 wherein said modulation logic means includes a plurality of programmable modulation registers for containing predetermined addressable modulation control signals.

21. Apparatus for enhancing the output of a print or display apparatus as recited in claim 20 wherein said apparatus is embodied in an application specific integrated circuit device which can be added to a conventional display device.

22. Apparatus for enhancing the output of a print or display apparatus as recited in claim 20 wherein said modulation logic means is adapted to support an external ROM/PAL containing additional predetermined addressable modulation control signals.

* * * * *